(12) United States Patent
Saito

(10) Patent No.: US 12,175,025 B2
(45) Date of Patent: Dec. 24, 2024

(54) ELECTRONIC PEN

(71) Applicant: SEIKO EPSON CORPORATION, Tokyo (JP)

(72) Inventor: Atsushi Saito, Chino (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 18/360,775

(22) Filed: Jul. 27, 2023

(65) Prior Publication Data

US 2024/0036660 A1 Feb. 1, 2024

(30) Foreign Application Priority Data

Jul. 29, 2022 (JP) ................................. 2022-121353

(51) Int. Cl.
*G06F 3/0354* (2013.01)

(52) U.S. Cl.
CPC ................................ *G06F 3/03542* (2013.01)

(58) Field of Classification Search
None
See application file for complete search history.

(56) References Cited

U.S. PATENT DOCUMENTS

| | | | | |
|---|---|---|---|---|
| 5,680,207 A | * | 10/1997 | Hagiwara | G01N 21/88 356/237.3 |
| 6,084,574 A | * | 7/2000 | Bidiville | G06F 3/03549 345/166 |
| 6,498,604 B1 | * | 12/2002 | Jensen | G06F 3/0312 345/166 |
| 6,625,314 B1 | * | 9/2003 | Okamoto | G06F 3/03545 382/121 |
| 9,383,834 B2 | * | 7/2016 | Srinivas | G06F 3/0317 |
| 2002/0125324 A1 | * | 9/2002 | Yavid | G06F 1/1632 707/E17.112 |
| 2004/0041798 A1 | | 3/2004 | Kim | |
| 2006/0028456 A1 | * | 2/2006 | Kang | G06F 3/0312 345/179 |
| 2006/0151610 A1 | * | 7/2006 | Chiang | G06V 30/1423 235/472.03 |
| 2007/0279399 A1 | * | 12/2007 | Nishimura | G06F 3/03546 345/179 |
| 2008/0142690 A1 | * | 6/2008 | Liu | G06F 3/03549 250/221 |
| 2010/0142856 A1 | * | 6/2010 | Takeuchi | G06V 10/17 382/314 |
| 2020/0233506 A1 | * | 7/2020 | King, Jr. | G06F 3/03546 |

FOREIGN PATENT DOCUMENTS

| | | |
|---|---|---|
| JP | 2004139562 | 5/2004 |
| JP | 2010141525 | 6/2010 |

* cited by examiner

*Primary Examiner* — Patrick N Edouard
*Assistant Examiner* — Peijie Shen
(74) *Attorney, Agent, or Firm* — JCIPRNET

(57) ABSTRACT

An electronic pen includes a rotating body rotatably supported on an object, a first detection member configured to detect movement of the rotating body, and a second detection member configured to detect movement of the object.

12 Claims, 6 Drawing Sheets

ELECTRONIC PEN

The present application is based on, and claims priority from JP Application Serial Number 2022-121353, filed Jul. 29, 2022, the disclosure of which is hereby incorporated by reference herein in its entirety.

BACKGROUND

1. Technical Field

The present disclosure relates to an electronic pen with which movement or the like of a pointer or a cursor can be performed.

2. Related Art

As an electronic pen, there is known an electronic pen including a pressure sensor that detects a writing operation based on pressure applied to a pen tip, and an imaging unit that includes an emission section and an imaging section and captures an image on a medium that a pen tip contacts (JP 2010-141525). In the device disclosed in JP 2010-141525, when the pressure sensor detects the pressure applied to the pen tip, the emission section emits light to the medium, and a light-receiving section receives light reflected by the medium. The device in JP 2010-141525 detects a position of the pen tip by analyzing a pattern image acquired by the light-receiving section.

In the device disclosed in JP 2010-141525, regarding a material of the medium to be irradiated with light, for example, when color is black, or there is no unevenness on a surface, the light-receiving section cannot receive the light reflected by the medium, and thus a position of the pen tip cannot be detected in some cases.

SUMMARY

An electronic pen according to an aspect of the present disclosure includes a rotating body rotatably supported on an object, a first detection member configured to detect movement of the rotating body, and a second detection member configured to detect movement of the object.

DESCRIPTION OF EXEMPLARY EMBODIMENTS

First Exemplary Embodiment

A first exemplary embodiment of an electronic pen according to the present disclosure will be described in detail below with reference to FIG. 1 and the like.

Figure 1:
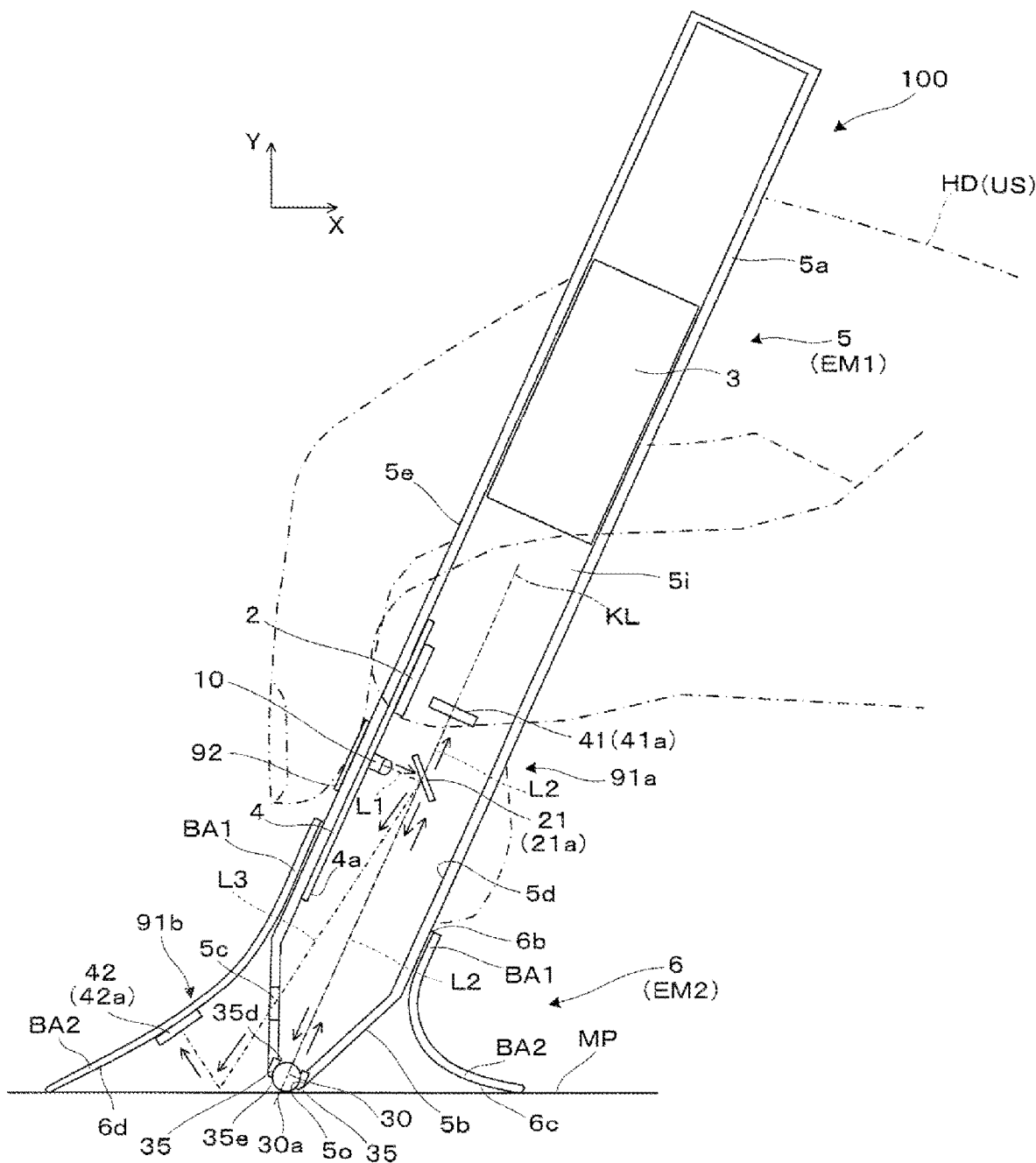
FIG. 1 is a vertical cross-sectional view illustrating an electronic pen of a first exemplary embodiment.

FIG. 1 is a side cross-sectional view of an electronic pen 100. The electronic pen 100 is a pen-type mouse attached to an electronic device to be described later, and when a hand HD of a user US grips and operates a pen barrel body 5a of the electronic pen 100, a pointer or a cursor displayed on a display or the like can be moved, or a click operation can be performed. The electronic pen 100 can stand by itself while being inclined at a predetermined angle.

The electronic pen 100 includes a light source 10, a first deflection member 21, a rotating body 30, a first detection member 41, a second detection member 42, an operation detection unit 92, a control unit 2, a power supply 3, a substrate 4, a case member 5, and a supporting body 6. In the electronic pen 100, the light source 10, the first deflection member 21, the rotating body 30, and the first detection member 41 function as a first operation direction acquisition unit 91a. The light source 10, the first deflection member 21, and the second detection member 42 function as a second operation direction acquisition unit 91b. The first and second operation direction acquisition units 91a and 91b acquire information about an operation amount and an operation direction of the electronic pen 100. The operation detection unit 92 detects that a specific operation such as clicking is performed on the electronic pen 100.

In the above description, the light source 10 and the first deflection member 21 constitute a first light projecting system in the first operation direction acquisition unit 91a, and the first deflection member 21 and the first detection member 41 constitute a first light receiving system. The light source 10 and the first deflection member 21 constitute a second light projecting system in the second operation direction acquisition unit 91b, and the second detection member 42 constitutes a second light receiving system. The light source 10 and the first deflection member 21 serve as a light projecting system common to the first and second operation direction acquisition units 91a and 91b.

The case member 5 is a vertically long cylindrical member of the electronic pen 100, and is a first exterior member EM1 extending along a reference axis KL. The case member 5 corresponds to an electronic pen case member, and includes the pen barrel body 5a, and a pen tip 5b. The pen barrel body 5a is a body portion of the case member 5, and has a cylindrical shape with a substantially constant thickness. The pen tip 5b is a portion to which the rotating body 30 is attached, and has a shape tapered downward. In an internal space 5i of the case member 5, the light source 10, the first deflection member 21, the rotating body 30, the first detection member 41, the control unit 2, the power supply 3, and the substrate 4 are housed. The light source 10 and the control unit 2 are fixed to a first surface 4a of the substrate 4 fixed to an inner surface 5d of the case member 5. The first deflection member 21 and the first detection member 41 are fixed to the case member 5 via a supporting member (not illustrated) extending from the inner surface 5d of the case member 5. An opening portion 5b for guiding emission light L3 to the second detection member 42 described later is provided at a part of the pen tip 5c.

The supporting body 6 is a cylindrical member spreading downward, and is a second exterior member EM2 that supports a lower portion of the case member 5. The supporting body 6 has a substantially constant thickness, and covers the pen tip 5b and a part of the pen barrel body 5a of the case member 5 from a periphery. The supporting body 6 includes a base portion BA1 and an inclined conical portion BA2. The supporting body 6 includes an upper opening portion 6b and a lower opening portion 6c. The upper opening portion 6b is formed at the base portion BA1, and the case member 5 can be inserted therein. The base portion BA1 supports the pen barrel body 5*a* that is inserted into the upper opening portion 6*b* and a periphery of which is covered with the base portion BA1. The case member 5 inserted into the opening portion 6*b* is slidable in the reference axis KL direction with respect to the supporting body 6. The inclined conical portion BA2 contacts an object MP at the lower opening portion 6*c*. An end of the lower opening portion 6*c*, as a whole, contacts the coplanar and flat object MP. The inclined conical portion BA2 guides movement of the electronic pen 100 in a direction parallel to a surface of the object MP. Since the case member 5 is supported by the supporting body 6, the electronic pen 100 can stand by itself even when the hand HD is released from the electronic pen 100.

The supporting body 6, as a whole, is inclined with respect to a Y-axis. The supporting body 6 has, for example, an asymmetric shape in a cross-sectional view of XY, and a symmetric shape in a cross-sectional view perpendicular to XY. An inclination angle of the supporting body 6 is based on the surface of the object MP, and is set in consideration of ease of gripping by the user US. Since the supporting body 6 is inclined, the case member 5 can be held in a state of being inclined at a predetermined angle.

In the supporting body 6, an outer diameter of the lower opening portion 6*c* is larger than an outer diameter of the upper opening portion 6*b*. Thus, the case member 5 can be stably supported. The upper opening portion 6*b* is provided with play with respect to the case member 5. That is, a diameter of an inner periphery of the base portion BA1 is slightly larger than a diameter of an outer periphery of the pen barrel body 5*a*, to allow free downward movement of the supporting body 6. Accordingly, the lower opening portion 6*c* of the supporting body 6 is brought into a state of being constantly in contact with the object MP, regardless of whether the rotating body 30 provided at the pen tip 5*b* contacts the object MP (to be specific, a mouse pad, a desk, or the like) serving as a base or not. A bottom portion of the supporting body 6 may be processed to reduce frictional resistance so as to be smoothly move on the object MP.

The substrate 4 is a plate-like member long and thin in a longitudinal direction of the electronic pen 100, that is, in a vertical direction. The substrate 4 is disposed below the pen barrel body 5*a*, in the internal space 5*i* of the case member 5. The power supply 3 is disposed on an upper side of the pen barrel body 5*a*. Various electronic components and circuit patterns including the light source 10, the control unit 2, and the like are mounted at the substrate 4. The substrate 4 is fixed at two positions of the inner surface 5*d* of the pen barrel body 5*a*, at an end portion of the substrate 4 in a short direction of the electronic pen 100, that is, in a lateral direction.

The light source 10 emits emission light L1. The light source 10 is disposed below the control unit 2 at the substrate 4, and emits the emission light L1 toward the reference axis KL at a center of the case member 5, that is, in a +X direction. The emission light L1 from the light source 10 is incident on the first deflection member 21. Examples of the light source 10 include a laser, an LED and the like, for example. When a laser is used as the light source 10, it is possible to further reduce power consumption while improving detection accuracy. Note that, when the light source 10 is a laser or an LED, a light flux cross-section can be adjusted by providing a lens at a light emitting unit of the light source 10.

The first deflection member 21 deflects the emission light L1 emitted from the light source 10. The first deflection member 21 is provided between the first detection member 41 and the rotating body 30. As a result, the first deflection member 21 causes an optical path to branch and linearly arrays the branches, so that disposition of the rotating body 30 and the first detection member 41 can be simplified. The first deflection member 21 is disposed at a position below the first detection member 41 and facing the rotating body 30. The first deflection member 21 deflects emission light L2 which is a part of the emission light L1 emitted from the light source 10 downward to be incident on a surface 30*a* of the rotating body 30, and transmits the emission light L2 returned from the rotating body 30 to be incident on the first detection member 41. That is, the emission light L1 emitted from the single light source 10 can be caused to branch to be incident on the rotating body 30, and the emission light L2 reflected by the rotating body 30 can be guided to the first detection member 41. In addition, the first deflection member 21 deflects the emission light L3, which is another part emitted from the light source 10, to the object MP on a lower side. That is, the emission light L1 emitted from the single light source 10 can be caused to branch, and the emission light L3 can be guided to the second detection member 42 via the opening portion 5*c*. By causing the emission light L1 emitted from the single light source 10 to branch, it is possible to suppress power consumption of the electronic pen 100.

The first deflection member 21 is a reflective type first diffraction element 21*a*. Accordingly, it is possible to increase a degree of freedom in disposition of the first detection member 41 and the like. The first diffraction element 21*a* can be a volume-hologram or a surface-relief hologram.

Figure 2:
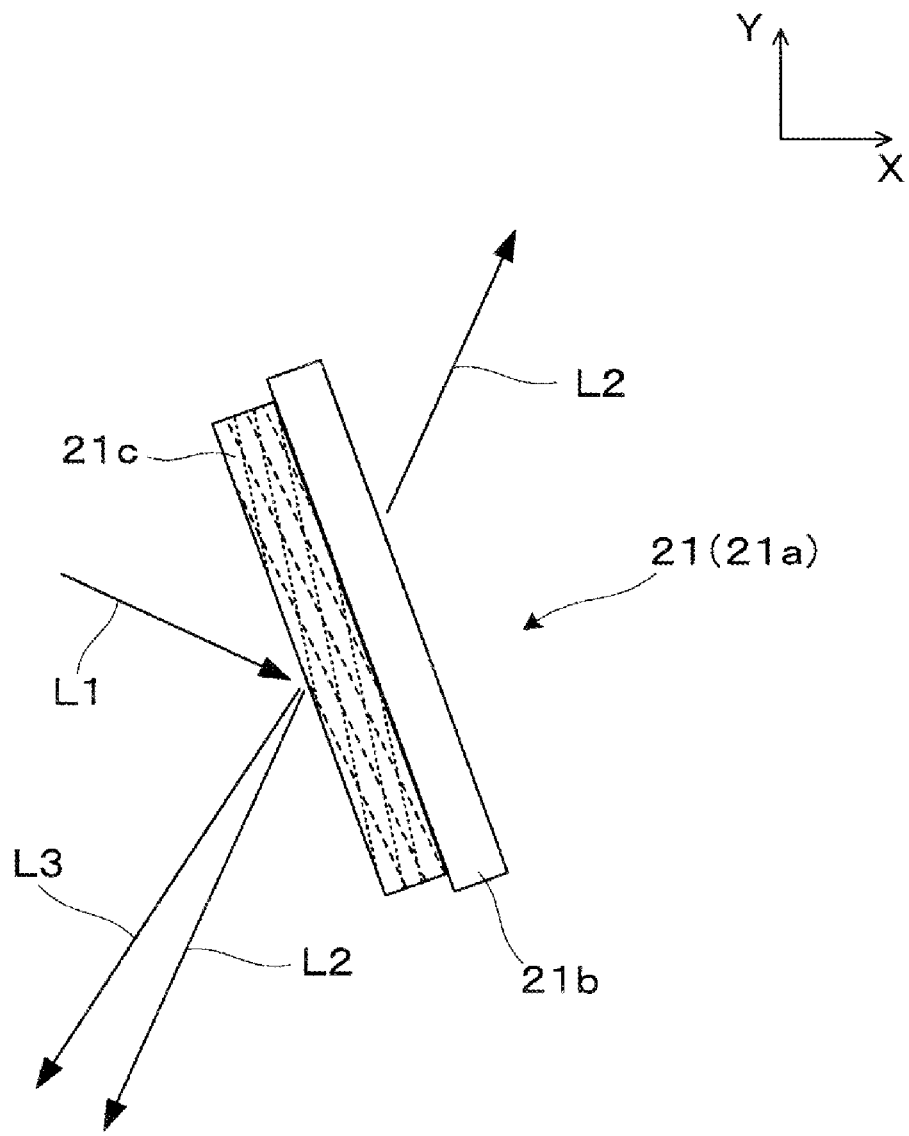
FIG. 2 is an enlarged view illustrating a first deflection member of the electronic pen.

For example, as illustrated in FIG. 2 in an enlarged manner, the first deflection member 21 includes a base portion 21*b*, and a volume-hologram layer 21*c*. The volume-hologram layer 21*c* is a multilayer reflection-type volume-hologram layer formed at one surface of the base portion 21*b*, and the volume-hologram layer 21*c* contains volume-hologram stripes. The volume-hologram stripes are obtained by three-dimensionally recording, for example, two interference patterns, specifically, refractive index diffraction patterns. The first deflection member 21 diffracts the emission light L2, which is a part of the emission light L1 emitted from the light source 10, toward the rotating body 30, and diffracts the emission light L3, which is the other part, toward the opening portion 5*c* or the second detection member 42. In addition, the first deflection member 21 transmits the emission light L2 reflected by the rotating body 30. In the first deflection member 21, the stripes of the volume-hologram can be appropriately provided with a lens effect. Further, the volume-hologram layer 21*c* may have one interference pattern, and a half mirror may be formed at a surface of the volume-hologram layer 21*c*. The first deflection member 21 may be a surface-relief hologram. The surface-relief hologram includes a resin layer in which a three dimensional hologram is formed as a relief surface at a surface of a base portion.

The rotating body 30 reflects the emission light L2 which is a part of the emission light L1 emitted by the light source 10, and is rotatable in any direction. The rotating body 30 is fitted in a bearing member 35 provided around an opening portion 5*o* of the pen tip 5*b*. The bearing member 35 rotatably supports the rotating body 30. By bringing the rotating body 30 into contact with only the bearing member 35, rotation of the rotating body 30 becomes smooth, and detection accuracy can be improved. The bearing member 35 includes opening portions 35*d* and 35*e* for exposing the rotating body 30 at upper and lower sides in an axial direction of the pen barrel body 5a, so that the rotating body 30 is partially exposed at the upper and lower sides. An upper exposed portion of the rotating body 30 reflects the emission light L2 (a part of the emission light L1) from the light source 10, and a lower exposed portion contacts the object MP (to be specific, a mouse pad, a desk, or the like).

The rotating body 30 is a small sphere or ball, and is formed of, for example, metal, resin, ceramic, or the like. The rotating body 30 is formed with random fine irregularities at the surface 30a thereof, but may have patterns at the surface 30a.

Figure 3:
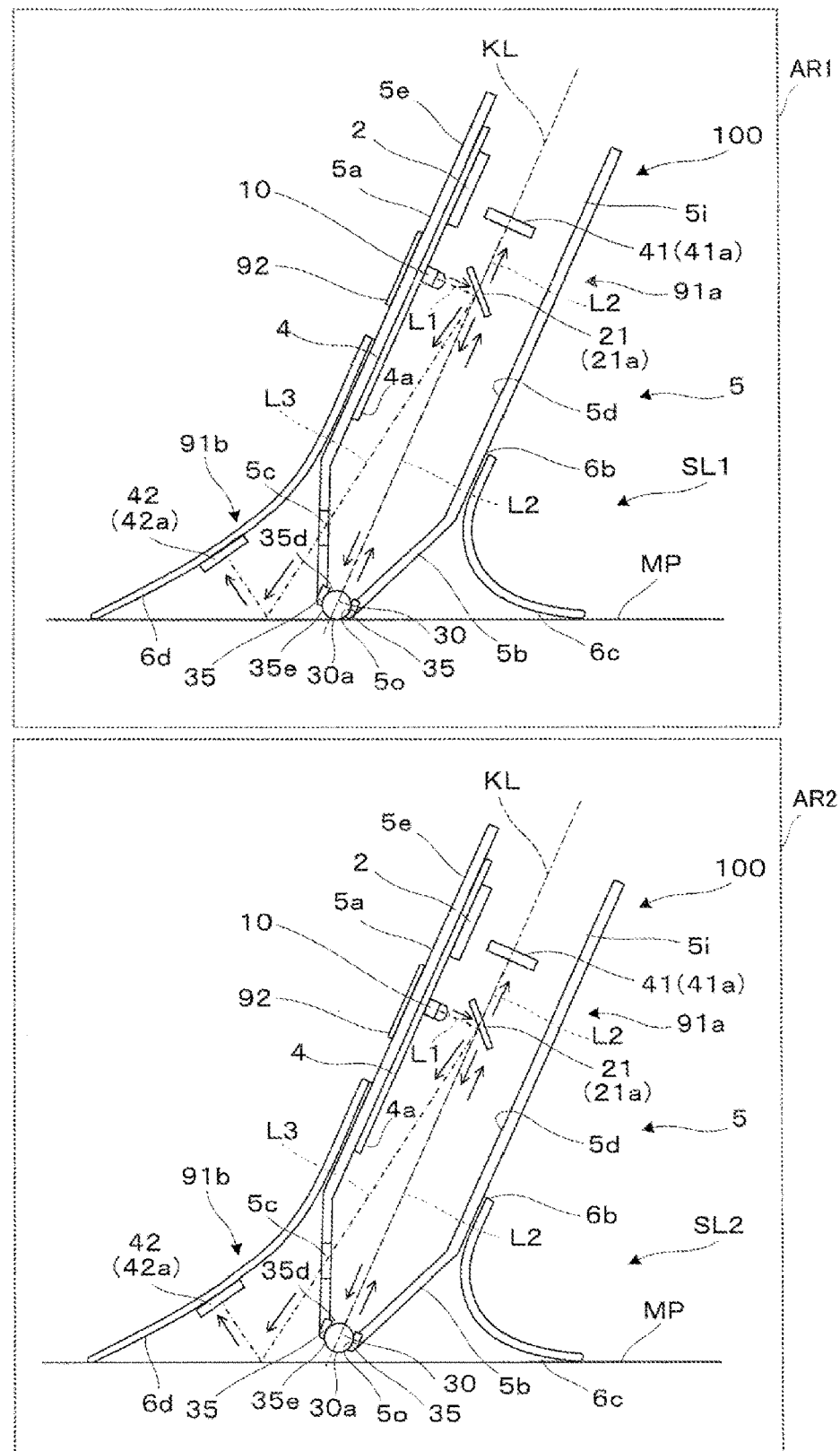
FIG. 3 is a diagram illustrating a state where a rotating body of the electronic pen contacts an object, and a state where the rotating body does not contact the object.

As illustrated in a region AR1 of FIG. 3, when the rotating body 30 contacts the object MP, predetermined pressure is applied to the rotating body 30. In this case, the rotating body 30 is located at a first position SL1 where rotation information can be extracted. As illustrated in a region AR2 of FIG. 3, when the rotating body 30 is separated from the object MP, pressure is not applied to the rotating body 30. In this case, the rotating body 30 is located at a second position SL2, which is different from the first position SL1, and in which rotation information cannot be extracted. Although details will be described later, which of the first position SL1 and the second position SL2 the rotating body 30 is located at affects priority of a detection result by the first detection member 41 and a detection result by the second detection member 42, output by the control unit 2.

The first detection member 41 receives the emission light L2 reflected by the first deflection member 21, and reflected by the rotating body 30, and acquires information about an operation amount and an operation direction. The first detection member 41 includes a first photoreceptor element 41a. The first detection member 41 includes, as the first photoreceptor element 41a, for example, a light amount sensor array in which a matrix of 18×18 is disposed, for example, a photodiode array. The first detection member 41 detects a speckle pattern or the like from the rotating body 30 by the light amount sensor array at a predetermined time period, and obtains a correlation of a series of patterns that change with time, thereby enabling acquisition of a movement amount and a movement direction of the rotating body 30. The speckle pattern is a random bright and dark pattern generated by reflected light beams interfering with each other, when emission light is emitted onto an object surface having fine irregularities. When a laser is used as the light source 10, high resolution is achieved by detecting the speckle as described above.

The second detection member 42 receives the third emission light L3 (a part of the emission light L1) reflected by the first deflection member 21, and acquires information about an operation amount and an operation direction. The second detection member 42 is provided outside the case member 5 and at an inner surface 6d of the supporting body 6. The second detection member 42 is provided at a position where the third emission light L3 passing through the opening portion 5c of the pen tip 5b and reflected by the object MP can be received. The second detection member 42 includes a second photoreceptor element 42a. The second detection member 42 is similar to the first detection member 41, and includes, as the second photoreceptor element 42a, for example, a light amount sensor array in which a matrix of 18×18 is disposed, for example, a photodiode array. The second detection member 42 detects a speckle pattern or the like from the object MP by the light amount sensor array at a predetermined time period, and obtains a correlation of a series of patterns that change with time, thereby enabling acquisition of a movement amount and a movement direction of the object MP, actually a movement amount and a movement direction of the electronic pen 100.

The operation detection unit 92 includes a switch mechanism (not illustrated), and detects that a specific operation such as clicking is performed by, for example, an ON operation or an OFF operation of a switch. The operation detection unit 92 is provided at an outer surface 5e of the case member 5. The operation detection unit 92 may be of a mechanical type that performs the ON or OFF operation by bringing contacts of a switch into contact with each other with biasing force equal to or greater than predetermined force to conduct electricity, or may be of an optical type that performs the ON or OFF operation depending on presence or absence of received light by displacement of a switch.

The control unit 2 controls operation of the light source 10, the first detection member 41, and the second detection member 42. The control unit 2 enables the first and second operation direction acquisition units 91a and 91b to acquire information about an operation amount and an operation direction of the electronic pen 100, and enables the operation detection unit 92 to detect that a specific operation, that is, clicking is performed.

The power supply 3 supplies electric power to the light source 10, the first detection member 41, the second detection member 42, and the control unit 2.

Hereinafter, a detailed configuration of the control unit 2 will be described with reference to FIG. 4. The control unit 2 includes an operation direction detection circuit 2a, an operation detection circuit 2b, a data communication unit 2c, and a control circuit 2d. The control unit 2 is a communication member CM that communicates with another electronic device 80 to be described later, and outputs movement information of the rotating body 30 or the object MP corresponding to movement of a mouse pointer.

The operation direction detection circuit 2a operates the light source 10, the first detection member 41, and the second detection member 42 under the control of the control circuit 2d. The operation direction detection circuit 2a emits the emission light L1 from the light source 10. In addition, the operation direction detection circuit 2a performs speckle image processing from the emission light L2 acquired by the first detection member 41, obtains a correlation of a series of speckle patterns that change with time, and generates date about a movement amount and a movement direction (an operation amount and an operation direction) of the rotating body 30. The operation direction detection circuit 2a outputs data about the movement amount and the movement direction of the rotating body 30 as horizontal or vertical two dimensional displacement data with respect to a surface that the rotating body 30 contacts. Also as for the second detection member 42, similarly to the first detection member 41, the operation direction detection circuit 2a generates data about a movement amount and a movement direction of the object MP from the emission light L3 acquired by the second detection member 42. Since a movement direction of the object MP is opposite to a movement direction of the electronic pen 100, the operation direction detection circuit 2a converts, with respect to the above data, the movement direction of the object MP into a movement direction of the electronic pen 100, and then outputs the movement direction as horizontal or vertical two dimensional displacement data of the electronic pen 100.

The operation detection circuit 2b operates the operation detection unit 92 under the control of the control circuit 2d. The operation detection circuit 2b senses that, for example, a finger of the user US is separated in the operation detection unit 92, and outputs a click signal.

The data communication unit 2c enables communication with the other electronic device 80. The data communication unit 2c transmits detection results of the first detection member 41 and the second detection member 42 to the other electronic device 80 such as a personal computer in a wireless or wired manner under the control of the control circuit 2d. To be specific, the data communication unit 2c transmits data about a movement amount and a movement direction of the rotating body 30 generated by the operation direction detection circuit 2a. The data communication unit 2c transmits data about a movement amount and a movement direction of the object MP (actually, a movement amount and a movement direction of the electronic pen 100) generated by the operation direction detection circuit 2a. Further, the data communication unit 2c transmits a click signal output from the operation detection circuit 2b.

The control circuit 2d controls operation of the operation direction detection circuit 2a, the operation detection circuit 2b, and the data communication unit 2c.

The control circuit 2d outputs a detection result of a movement amount and the like of any one of the rotating body 30 and the object MP as a movement amount and the like of the electronic pen 100 via the data communication unit 2c. When detecting movement amounts and the like of both the rotating body 30 and the object MP, the control circuit 2d determines priority of the detection results, that is, preferential operation information, in accordance with a preset rule, in order to output the detection result of either one. When detecting a movement amount and the like of only one of the rotating body 30 and the object MP, the control circuit 2d outputs that detection result.

Due to the play between the case member 5 and the supporting body 6, the supporting body 6 of the electronic pen 100 constantly contacts the object MP regardless of whether the rotating body 30 contacts the object MP or not. Thus, as far as the reflected light from the object MP can be received, the second detection member 42 constantly detects a movement amount and a movement direction of the object MP. In an operation of the electronic pen 100, the rotating body 30 may be difficult to rotate depending on the object MP serving as a base. Further, when the electronic pen 100 is used as a writing instrument, there is a moment when the rotating body 30 is separated from the object MP as illustrated in the region AR2 of FIG. 3, and there is a case where movement of the rotating body 30 cannot be detected. In this case, the control circuit 2d preferentially outputs a detection result of the object MP rather than a detection result of the rotating body 30 as a movement amount and the like of the electronic pen 100. Note that, when reflection of the object MP is poor, movement of the object MP cannot be detected. In this case, the control circuit 2d preferentially outputs a detection result of the rotating body 30 rather than a detection result of the object MP as a movement amount and the like of the electronic pen 100.

For example, the control circuit 2d compares a movement amount and the like of the rotating body 30 with a movement amount and the like of the object MP, outputs the larger movement amount and the like, and moves a mouse pointer in the electronic device 80. That is, the control circuit 2d uses large or small of the movement amounts and the like of the rotating body 30 and the object MP as a trigger, to determine output priority of the movement amount or the like of the rotating body 30 or the object MP. To be specific, when the movement amount of the rotating body 30 is equal to or larger than the movement amount of the object MP, the control circuit 2d outputs the movement amount of the rotating body 30 to be used as a movement amount of the electronic pen 100 to the electronic device 80. In addition, when the movement amount of the object MP is larger than the movement amount of the rotating body 30, the movement amount of the object MP is output to the electronic device 80 to be used as the movement amount of the electronic pen 100. Accordingly, by comparing the movement amount of the rotating body 30 with the movement amount of the object MP, it is possible to automatically switch the movement amounts to apply to the movement amount of the electronic pen 100.

When a movement amount of the rotating body 30 cannot be detected by the first detection member 41, the control circuit 2d outputs a movement amount of the object MP to the electronic device 80 to be used as a movement amount of the electronic pen. Accordingly, even when the rotating body 30 is separated from the object MP, it is possible to output the movement amount of the electronic pen 100. Further, when a movement amount of the object MP cannot be detected by the second detection member 42, the control circuit 2d outputs a movement amount of the rotating body 30 to the electronic device 80 to be used as a movement amount of the electronic pen.

Figure 5:
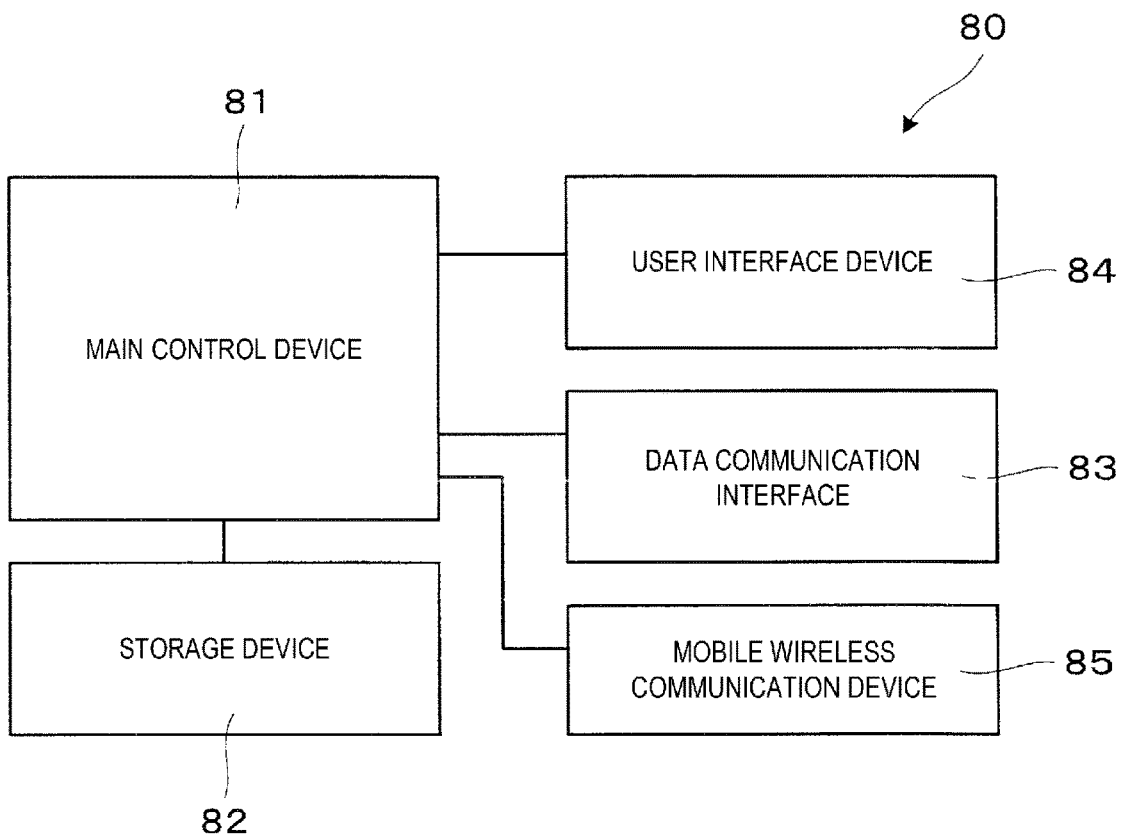
FIG. 5 is a block diagram illustrating another device that communicates with the electronic pen.

FIG. 5 is a block diagram illustrating the electronic device 80 that performs data communication with the electronic pen 100 illustrated in FIG. 1 and the like, and accepts a signal output. The electronic device 80 includes a main control device 81, a storage device 82, a data communication interface 83, a user interface device 84, and a mobile wireless communication device 85. In the storage device 82, a basic program for operating the electronic device 80 is stored, and various types of application software that operate on the basic program are stored. The data communication interface 83 supports near field communication standards such as Bluetooth (registered trademark) or Wi-Fi, and transmits and receives data signals to and from the control unit 2 of the electronic pen 100. The user interface device 84 includes a display for presenting information to the user, a keyboard operated by the user, and the like. The main control device 81 integrally controls operation of the storage device 82, the data communication interface 83, the user interface device 84, and the like. In particular, the main control device 81 can receive information from the electronic pen 100 via the data communication interface 83, and can transmit a control signal to the electronic pen 100. Accordingly, the main control device 81 can receive data related to a movement amount and a movement direction of the rotating body 30 provided at the electronic pen 100, and a click signal. Note that, the electronic device 80 can communicate with various devices such as an external server via a communication network (not illustrated) by the mobile wireless communication device 85.

As the electronic device 80 illustrated in FIG. 5, typically a personal computer is assumed, but various video display devices and game devices may be used. Such devices and the electronic pen 100 can be operated in combination.

In the above description, the first deflection member 21 may be a beam splitter in addition to the first diffraction element 21a. The beam splitter is a half mirror that transmits and reflects the emission light L1. The beam splitter deflects the emission light L1 from the light source 10 toward the rotator 30 as the emission light L2, and transmits the emission light L2 reflected from the rotating body 30. Further, the beam splitter deflects the emission light L1 from the light source 10 toward the second detection member 42 as the emission light L3. The beam splitter is obtained by forming a semi-transmissive film made of metal or the like at a surface of a flat base material, for example. The beam splitter is not limited to a planar semi-transmissive mirror, and may be a beam splitter that involves a converging action or a diverging action when bending an optical path.

The electronic pen 100 of the first exemplary embodiment described above includes the rotating body 30 rotatably supported on the object MP, the first detection member 41 that detects movement of the rotating body 30, and the second detection member 42 that detects movement of the object MP.

In the above electronic pen 100, even when any one of movement of the rotating body 30 and movement of the object MP cannot be detected, movement of another can be detected. Accordingly, it is possible to prevent movement of a pen-type input device itself from being undetectable.

Second Exemplary Embodiment

Hereinafter, an electronic pen according to a second exemplary embodiment of the present disclosure will be described. Note that, the electronic pen of the second exemplary embodiment is obtained by partially modifying the electronic pen of the first exemplary embodiment, and description of common parts will be omitted.

Figure 6:
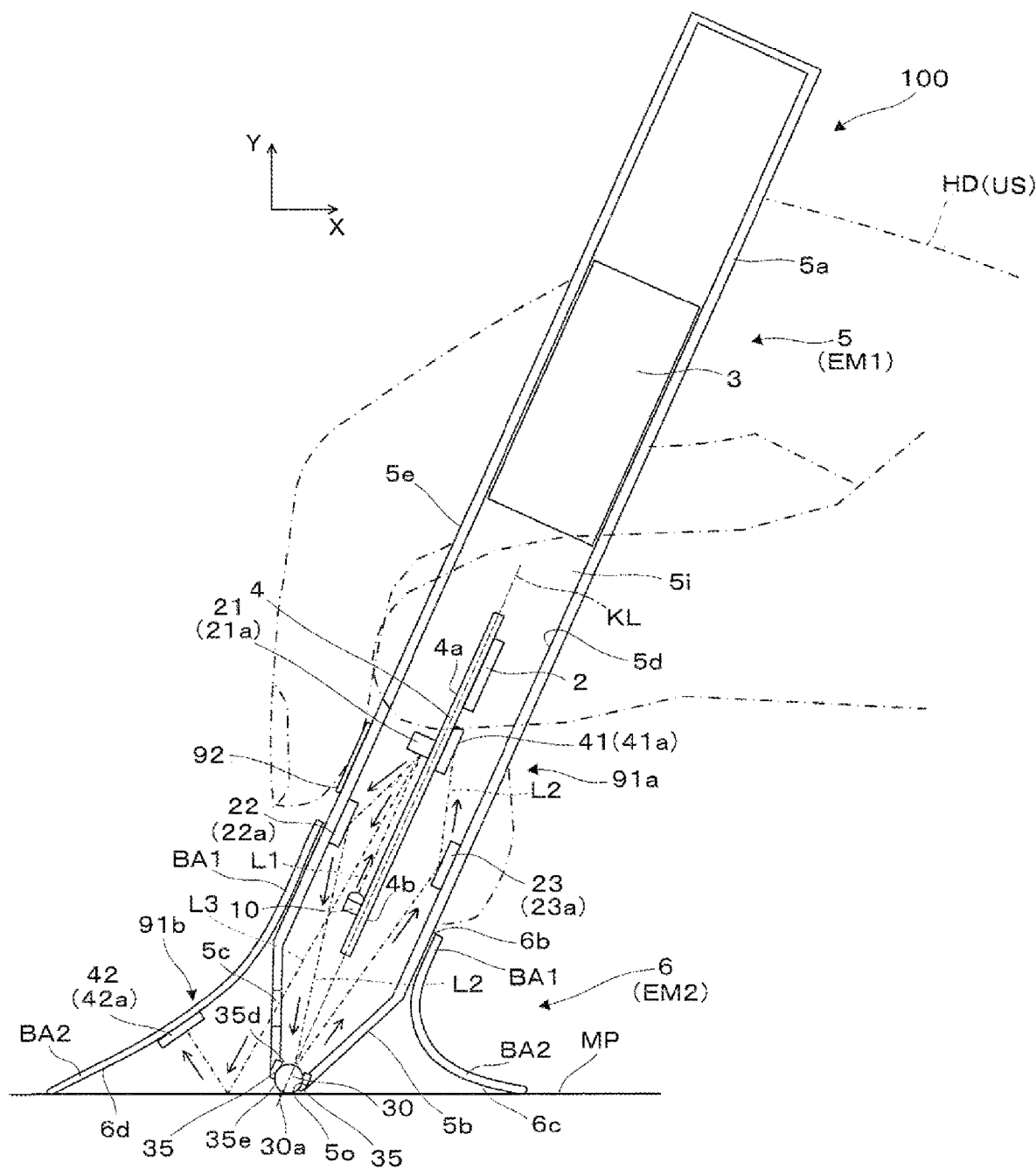
FIG. 6 is a vertical cross-sectional view illustrating an electronic pen of a second exemplary embodiment.

As illustrated in FIG. 6, the electronic pen 100 includes the light source 10, the first deflection member 21, the second deflection member 22, the rotating body 30, a third deflection member 23, the first detection member 41, the second detection member 42, the operation detection unit 92, the control unit 2, the power supply 3, the substrate 4, the case member 5, and the supporting body 6. In the electronic pen 100, the light source 10, the first deflection member 21, the second deflection member 22, the rotating body 30, the third deflection member 23, and the first detection member 41 function as the first operation direction acquisition unit 91a. The light source 10, the first deflection member 21, and the second detection member 42 function as the second operation direction acquisition unit 91b.

In the above description, the light source 10, the first deflection member 21, and the second deflection member 22 constitute a first light projecting system in the first operation direction acquisition unit 91a, and the third deflection member 23 and the first detection member 41 constitute a first light receiving system. In addition, the light source 10 and the first deflection member 21 constitute a second light projecting system in the second operation direction acquisition unit 91b, and the second detection member 42 constitutes a second light receiving system.

The light source 10, the first deflection member 21, the second deflection member 22, the rotating body 30, the third deflection member 23, the first detection member 41, the control unit 2, the power supply 3, and the substrate 4 are housed in the internal space 5i of the case member 5. The light source 10 and the first deflection member 21 are fixed to one first surface 4a of the substrate 4, and the first detection member 41 and the control unit 2 are fixed to another second surface 4b of the substrate 4. The second deflection member 22 and the third deflection member 23 are directly fixed to the inner surface 5d of the case member 5, or indirectly fixed to the inner surface 5d via a member (not illustrated).

The substrate 4 is a plate member, and is disposed below the pen barrel body 5a in the internal space 5i of the case member 5. Various electronic components and circuit patterns including the light source 10, the first deflection member 21, the first detection member 41, the control unit 2, and the like are mounted at the substrate 4.

As illustrated in FIG. 6, the substrate 4 is fixed so that the one first surface 4a of the substrate 4 faces an upside of an inclination of the case member 5, and is sandwiched between two opposing positions of the inner surface 5a of the pen barrel body 5d at an end portion in a lateral direction of the substrate 4. The substrate 4 is disposed along the reference axis KL passing through a center of the rotating body 30 disposed at a center of the pen tip 5b. Accordingly, optical elements can be disposed on both the surfaces of the substrate 4, and space saving is facilitated. Further, by disposing the substrate 4 near a center of the case member 5, a relatively large area of the substrate 4 can be secured.

The light source 10 emits the emission light L1. The light source 10 is disposed on a lower part of the first surface 4a of the substrate 4. Further, the light source 10 is disposed between the rotating body 30 and the first deflection member 21 in a side cross-sectional view or a vertical cross-sectional view. Thus, the light source 10 and the first deflection member 21 can be disposed on the same substrate.

The first deflection member 21 deflects the emission light L1 emitted from the light source 10. The first deflection member 21 is disposed above the light source 10, at the first surface 4a of the substrate 4 in a side cross-sectional view. The first deflection member 21 is a reflective type first diffraction element 21a. The first diffraction element 21a can be a volume-hologram or a surface-relief hologram.

The second deflection member 22 deflects the emission light L2, which is a part of the emission light L1 deflected by the first deflection member 21, toward the rotating body 30. The second deflection member 22 is disposed on an optical path from the first deflection member 21 to the rotating body 30. The second deflection member 22 is disposed at a height position substantially in the middle between the first deflection member 21 and the rotating body 30, at the inner surface 5d of the pen barrel body 5a in a side cross-sectional view. The second deflection member 22 is a reflective type second diffraction element device 22a. The second diffraction element 22a can be a volume-hologram or a surface-relief hologram.

The third deflection member 23 deflects the emission light L2 reflected by the rotating body 30 toward the first detection member 41. The third deflection member 23 is disposed on an optical path from the rotating body 30 to the first detection member 41. The third deflection member 23 is disposed at a height position substantially in the middle between the rotating body 30 and the first detection member 41, at the inner surface 5d of the pen barrel body 5a in a side cross-sectional view. The third deflection member 23 is a reflective type third diffraction element 23a. The third diffraction element 23a can be a volume-hologram or a surface-relief hologram.

As described above, by providing each of the second and third deflection members 22 and 23 on the optical path, it is possible to deflect light in any direction, and to increase a degree of freedom in disposition of optical elements.

The first detection member 41 receives the emission light L2 reflected by the rotating body 30, and acquires information about an operation amount and an operation direction. The first detection member 41 is disposed above the third deflection member 23, at the second surface 4b of the substrate 4 in a side cross-sectional view.

The second detection member 42 receives the third emission light L3 reflected by the first deflection member 21, and acquires information about an operation amount and an operation direction. The second detection member 42 is provided outside the case member 5 and at an inner surface 6d of the supporting body 6. The second detection member 42 is provided at a position where the third emission light L3 passing through the opening portion 5c of the pen tip 5b and reflected by the object MP can be received.

In the above description, the second and third deflection members 22 and 23 are not limited to the second and third diffraction elements 22a and 23a, and may be small-sized plane mirrors. The plane mirror is obtained by forming a reflection coating made of metal or the like at a surface of a flat base material, for example. Further, the second and third deflection members 22 and 23 may be concave mirrors or the like that involves a converging action when bending an optical path.

Third Exemplary Embodiment

Hereinafter, an electronic pen according to a third exemplary embodiment of the present disclosure will be described. Note that, the electronic pen of the third exemplary embodiment is obtained by partially modifying the electronic pen of the first exemplary embodiment, and description of common parts will be omitted.

Figure 7:
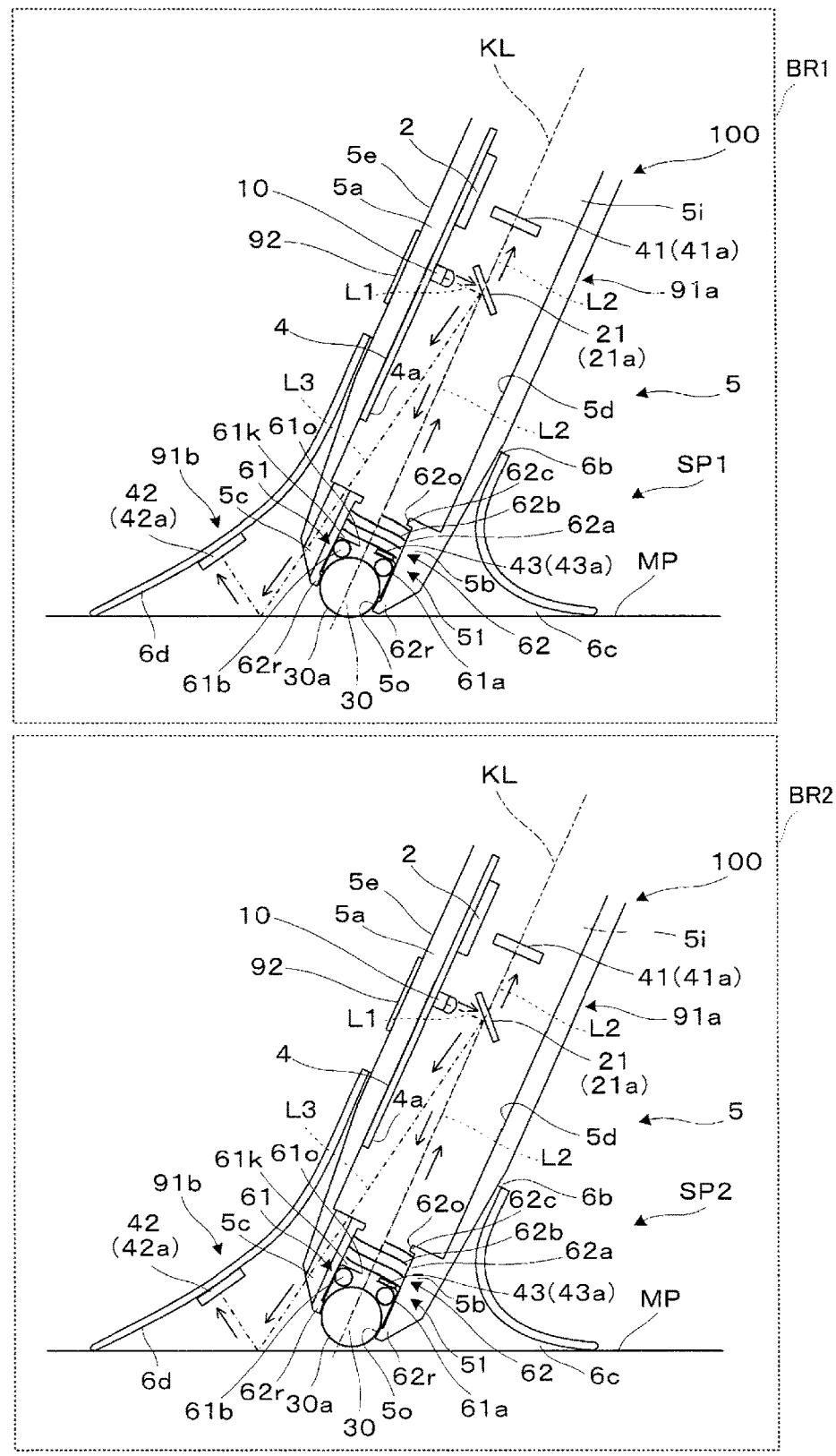
FIG. 7 is a vertical cross-sectional view illustrating an electronic pen of a third exemplary embodiment.

As illustrated in FIG. 7, in the present exemplary embodiment, the electronic pen 100 further includes a third detection member 43 that detects movement of the rotating body 30 in a direction along a longitudinal direction of the electronic pen 100. As the third detection member 43, for example, a pressure sensor, an optical sensor, or the like is used.

FIG. 7 illustrates an example in which the third detection member 43 is a pressure sensor 43a. The rotating body 30 is supported by a holding member 51 at a tip portion of the pen tip 5b of the case member 5 so as to be rotatable and retractable. Specifically, the rotating body 30 is rotatably supported by a supporting member 61 provided at the holding member 51, and is guided by a movable member 62 provided at the holding member 51 so as to be movable in the reference axis KL direction together with the supporting member 61.

In the holding member 51, the supporting member 61 has structure similar to that of a free ball bearing, and allows free rotation of the rotating body 30. The supporting member 61 includes a frame body 61a and a plurality of balls 61b. The frame body 61a is a ball receiver having a cylindrical vessel shape and including an opening portion 61o at a bottom plate 61k, and supports the rotating body 30 via the plurality of balls 61b. The plurality of balls 61b are rotatably supported at an upper corner corresponding to a bottom of the frame body 61a.

The movable member 62 has structure similar to that of a plunger, and allows the supporting member 61 to slide therein in the reference axis KL direction. The movable member 62 includes a cylindrical inner wall portion 62a provided at the pen tip 5b, a spring 62b disposed so as to be surrounded by the inner wall portion 62a, and a stopper 62c for fixing an upper end of the spring 62b. The internal wall portion 62a houses the frame body 61a of the supporting member 61, and causes the frame body 61a to smoothly slide along the reference axis KL. The spring 62b biases the frame body 61a of the supporting member 61 downward. When the user pushes the pen tip 5b downward via the pen barrel body 5a, the supporting member 61 retracts in the movable member 62 against the spring 62b. When the user weakens the force for pushing the pen barrel body 5a, and the pen tip 5b is no longer pushed downward, the supporting member 61 is biased by the spring 62b and advances in the movable member 62. At the pen tip 5b, a small-diameter portion 62r having a diameter reduced toward a tip end side of the inner wall portion 62a is formed, so that the rotating body 30 supported by the supporting member 61 or the movable member 62 is regulated not to protrude to the tip end side by a predetermined amount or more.

In the supporting member 61 of the holding member 51, the opening 61o formed at the bottom plate 61k of the frame body 61a opens an upper portion of the rotating body 30 to the internal space 5i side. Further, in the movable member 62, an opening 62o is formed at the stopper 62c. The opening 62o of the stopper 62c has a larger diameter than that of the opening 61o, exposes the bottom plate 61k of the frame body 61a to the internal space 5i, and allows the upper portion of the rotating body 30 in the supporting member 61 to face the internal space 5i. As a result, the rotating body 30 is partially exposed upward and downward. An upper exposed portion of the rotating body 30 reflects the first emission light L1 from the light source 10, and a lower exposed portion contacts the object MP.

The third detection member 43 is the pressure sensor 43a, and is provided between the frame body 61a and the spring 62b. The pressure sensor 43a detects pressure applied to the rotating body 30 by displacement in a direction along a longitudinal direction of the rotating body 30 using the movable member 62.

As illustrated in a region BR1 of FIG. 7, when the rotating body 30 contacts the object MP, a predetermined pressure is applied to the rotating body 30. In this case, the rotating body 30 is located at a first position SL1 where rotation information can be extracted. As illustrated in a region BR2 of FIG. 7 when the rotating body 30 is separated from the object MP, pressure is not applied to the rotating body 30. In this case, the rotating body 30 is located at a second position SL2, which is different from the first position SL1, and in which rotation information cannot be extracted.

Figure 4:
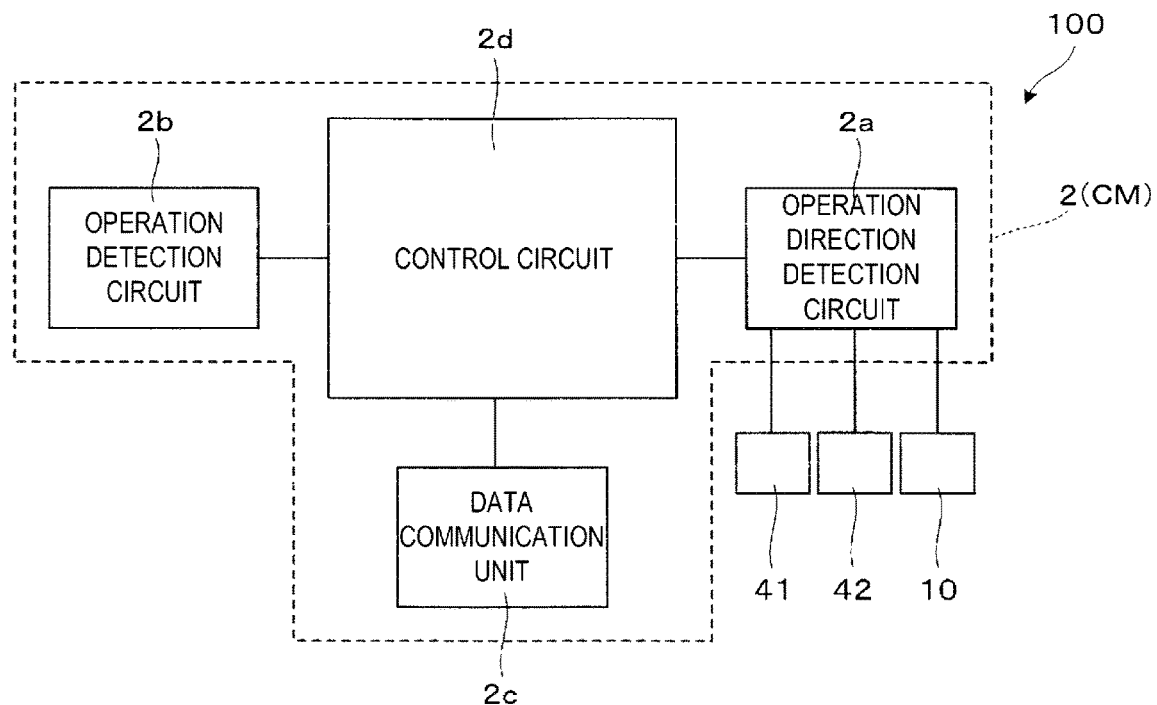
FIG. 4 is a diagram illustrating a control unit of the electronic pen.

In the control unit 2 illustrated in FIG. 4, the control circuit 2d outputs a movement amount of the object MP to the electronic device 80 to be used as a movement amount of the electronic pen 100, via the data communication unit 2c, when the rotating body 30 is at the second position SL2 different from the first position SL1 where the rotating body 30 contacts the object MP, in the direction along the longitudinal direction of the electronic pen 100. That is, when the rotating body 30 is at the second position SL2 away from the object MP, the third detection member 43 does not detect pressure, and as a result, the control circuit 2d preferentially outputs a movement amount and the like of the object MP, with vertical displacement of the rotating body 30 as a trigger. Accordingly, a position of the rotating body 30 in a direction toward the longitudinal direction of the electronic pen 100 can be indirectly monitored by the third detection member 43, and a movement amount of the electronic pen 100 can be output even when the rotating body 30 is at the second position SL2 away from the object MP.

In the above description, although not illustrated, the third detection member 43 may be an optical sensor. As light received by the optical sensor, the emission light L1 of the light source 10 may be utilized, or other light source may be provided. In this case, for example, a deflection member is provided between the frame body 61a and the spring 62b, and the optical sensor is disposed so as to receive reflected light from the deflection member. The deflection member reflects light from the light source 10, and the optical sensor receives the light reflected by the deflection member. Since amounts of light received by the optical sensor are different between the first position SL1 and the second position SL2, the first position SL1 and the second position SL2 can be distinguished from each other.

Others

The structures described above are examples and various modifications can be made without departing from the scope capable of achieving the same functions.

In the above description, the disposition and the number of the optical elements constituting the operation direction acquisition units 91a and 91b are illustrative, and can be variously modified according to application.

The second detection member 42 can be provided in the internal space 5i of the case member 5. In this case, the supporting body 6 need not be provided. However, although depending on design of an optical path, it is desirable to hold the electronic pen 100 so that the second detection member 42 can detect the emission light L3 reflected from the object MP.

The electronic pen 100 can be used not only for working with a PC, but also as an input device for an HMD or the like.

An electronic pen in a specific embodiment of the present disclosure includes a rotating body rotatably supported on an object, a first detection member configured to detect movement of the rotating body, and a second detection member configured to detect movement of the object.

In the above electronic pen, even when any one of movement of the rotating body and movement of the object cannot be detected, movement of another can be detected. Accordingly, it is possible to prevent movement of a pen-type input device itself from being undetectable.

In a specific aspect, a light source configured to emit light is included, wherein the first detection member includes a first photoreceptor element that receives light reflected by the rotating body, and the first detection member detects movement of the rotating body based on light received by the first photoreceptor element.

In a specific aspect, a first deflection member configured to deflect a part of light emitted from the light source toward the rotating body, and transmit light reflected by the rotating body toward the first detection member is included. In this case, light emitted from a single light source can be caused to branch and to be incident on the rotating body by the first deflection member, and light reflected by the rotating body can be guided to the first detection member.

In a specific aspect, the first deflection member is provided between the rotating body and the first detection member. In this case, the first deflection member causes an optical path to branch and linearly arrays the branches, so that disposition of the rotating body and the first detection member can be simplified.

In a specific aspect, the first deflection member deflects another part of light emitted from the light source toward the object, the second detection member includes a second photoreceptor element that receives light reflected by the object, and the second detection member detects movement of the object based on light received by the second photoreceptor element. In this case, power consumption of an electronic pen can be suppressed by causing light emitted from a single light source to branch.

In a specific aspect, a first exterior member configured to accommodate the light source, the first deflection member, the rotating body, and the first detection member, and a second exterior member attached to the first exterior member, and provided with the second detection member is included. In this case, the first exterior member can be caused to stand by itself, by attaching the second exterior member to the first exterior member.

In a specific aspect, the first deflection member is a diffraction element. In this case, it is possible to increase a degree of freedom in disposition of a first detection member and the like.

In a specific aspect, a second deflection member configured to deflect light deflected by the first deflection member toward the rotating body, and a third deflection member configured to deflect light reflected by the rotating body toward the first detection member are included. In this case, by providing each of the second and third deflection members on an optical path, it is possible to deflect light in any direction, and to increase a degree of freedom in disposition of optical elements.

In a specific aspect, the light source is provided between the rotating body and the first deflection member. In this case, the light source and the first deflection member can be disposed at the same substrate.

In a specific aspect, a communication member configured to communicate with another device is included, wherein the communication member outputs a movement amount of the rotating body to the other device to use the movement amount of the rotating body as a movement amount of the electronic pen, when the movement amount of the rotating body is larger than a movement amount of the object, and outputs the movement amount of the object to the other device to use the movement amount of the object as a movement amount of the electronic pen, when the movement amount of the object is larger than the movement amount of the rotating body. In this case, by comparing the movement amount of the rotating body with the movement amount of the object, it is possible to automatically switch the movement amounts to apply to the movement amount of the electronic pen.

In a specific aspect, when a movement amount of the rotating body is not detectable by the first detection member, the communication member outputs a movement amount of the object to the other device to use the movement amount of the object as a movement amount of the electronic pen. In this case, it is possible to output the movement amount of the electronic pen even when the rotating body is separated from the object.

In a specific aspect, a third detection member configured to detect movement of the rotating body in a direction along a longitudinal direction of the electronic pen is included, wherein when the rotating body is at a second position different from a first position where the rotating body contacts the object in the direction along the longitudinal direction of the electronic pen, the communication member outputs a movement amount of the object to the other device to use the movement amount of the object as a movement amount of the electronic pen. In this case, it is possible to monitor a position of the rotating body in a direction toward the longitudinal direction of the electronic pen by the third detection member, and output a movement amount of the electronic pen even when the rotating body is at the second position away from the object.

What is claimed is:
1. An electronic pen, comprising:
a rotating body configured to be rotatably supported on an object;
a first detection member configured to detect movement of the rotating body relative to the object;
a second detection member configured to detect movement of the object relative to a first exterior member;
the first exterior member configured to accommodate the rotating body and the first detection member; and a second exterior member attached to a lower portion of the first exterior member, provided with the second detection member, and configured to contact the object, wherein in a case where there is a relative movement between the rotating body and the object, the first detection member detects the movement of the rotating body, and the second detection member detects the movement of the object.

2. The electronic pen according to claim 1, comprising a light source configured to emit light, wherein the first detection member includes a first photoreceptor element configured to receive light reflected by the rotating body, and the first detection member detects the movement of the rotating body based on the light received by the first photoreceptor element.

3. The electronic pen according to claim 2, comprising a first deflection member configured to deflect a part of the light emitted from the light source toward the rotating body, and transmit the part of the light reflected by the rotating body toward the first detection member.

4. The electronic pen according to claim 3, wherein the first deflection member is provided between the rotating body and the first detection member.

5. The electronic pen according to claim 3, wherein the first deflection member is configured to deflect another part of the light emitted from the light source toward the object, the second detection member includes a second photoreceptor element configured to receive the another part of the light reflected by the object, and the second detection member detects the movement of the object based on the another part of the light received by the second photoreceptor element.

6. The electronic pen according to claim 3, wherein the first exterior member is configured to accommodate the light source and the first deflection member.

7. The electronic pen according to claim 3, wherein the first deflection member is a diffraction element.

8. The electronic pen according to claim 3, comprising:

a second deflection member configured to deflect the part of the light deflected by the first deflection member toward the rotating body; and a third deflection member configured to deflect the part of the light reflected by the rotating body toward the first detection member.

9. The electronic pen according to claim 3, wherein the light source is provided between the rotating body and the first deflection member.

10. The electronic pen according to claim 1, comprising a communication member configured to communicate with another device, wherein the communication member outputs a movement amount of the rotating body to the other device to use the movement amount of the rotating body as a movement amount of the electronic pen, when the movement amount of the rotating body is larger than a movement amount of the object, and outputs the movement amount of the object to the other device to use the movement amount of the object as the movement amount of the electronic pen, when the movement amount of the object is larger than the movement amount of the rotating body.

11. The electronic pen according to claim 10, wherein, when the movement amount of the rotating body is not detectable by the first detection member, the communication member outputs the movement amount of the object to the other device to use the movement amount of the object as the movement amount of the electronic pen.

12. The electronic pen according to claim 10, comprising a third detection member configured to detect the movement of the rotating body in a direction along a longitudinal direction of the electronic pen, wherein when the rotating body is at a second position different from a first position where the rotating body contacts the object in the direction along the longitudinal direction of the electronic pen, the communication member outputs the movement amount of the object to the other device to use the movement amount of the object as the movement amount of the electronic pen.

* * * * *